United States Patent [19]

Hindermyer

[11] Patent Number: 4,520,588
[45] Date of Patent: Jun. 4, 1985

[54] FISHING LURE

[76] Inventor: Charles Hindermyer, 1766 Creek Rd., Hatfield, Pa. 19440

[21] Appl. No.: 557,868

[22] Filed: Dec. 5, 1983

[51] Int. Cl.³ ............................................. A01K 85/00
[52] U.S. Cl. .................................... 43/42.06; 43/42.05; 43/42.36; 43/17.6
[58] Field of Search .................... 43/42.1, 42.04, 42.05, 43/42.06, 42.24, 42.36, 17.6

[56] References Cited

U.S. PATENT DOCUMENTS

| | | | |
|---|---|---|---|
| 2,577,402 | 12/1951 | Carnes | 43/42.08 |
| 3,576,987 | 5/1971 | Voight | 43/17.6 |
| 3,863,380 | 2/1975 | Purlia | 43/17.6 |
| 3,921,328 | 11/1975 | Holcombe | 43/42.06 |
| 3,991,504 | 11/1976 | Pieper | 43/42.06 |
| 4,208,822 | 6/1980 | Bryant | 43/42.24 |
| 4,215,506 | 8/1980 | Le Boeuf | 43/42.05 |

Primary Examiner—Gene P. Crosby
Attorney, Agent, or Firm—Steele, Gould & Fried

[57] ABSTRACT

A fishing lure for use with a line having terminal gear has a flexible tubular body; a head member attachable to the tubular body at one end and having at least one axial bore therethrough; an end cap attachable to the tubular body at the other end and having at least one axial bore therethrough. The lure is threadable over the line, which passes through the bore in the head, through the tubular member and through the bore in the end cap. The bore in the end cap is sufficiently small to prevent the terminal gear, including a hook, from passing therethrough, whereby the lure flexes on the line as the lure is pushed through the water by the terminal gear engaging the end cap, as the terminal gear is itself pulled through the water by the line. The lure may further comprise first and second elastic members tightly engaging around the lure and spaced from one another, under which a section of the line may be releasably held. The lure may still further comprise a self-contained chemical light disposed in the tubular body and a decorative skirt member overfitting the flexible body and portions of the terminal gear.

11 Claims, 4 Drawing Figures

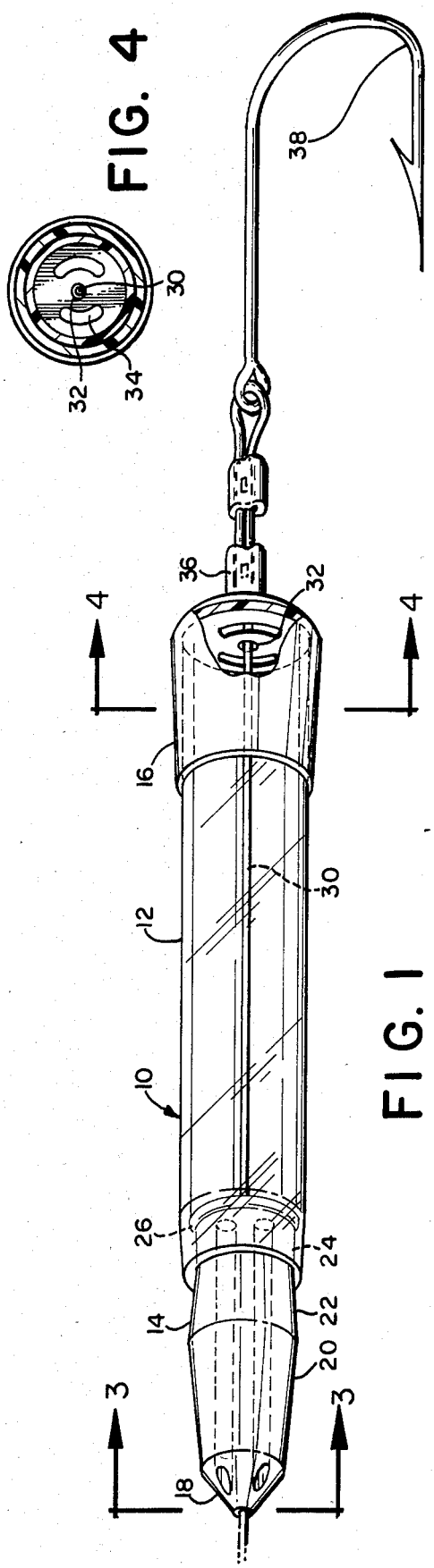
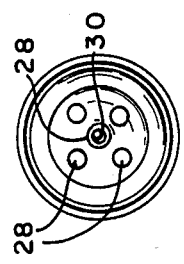
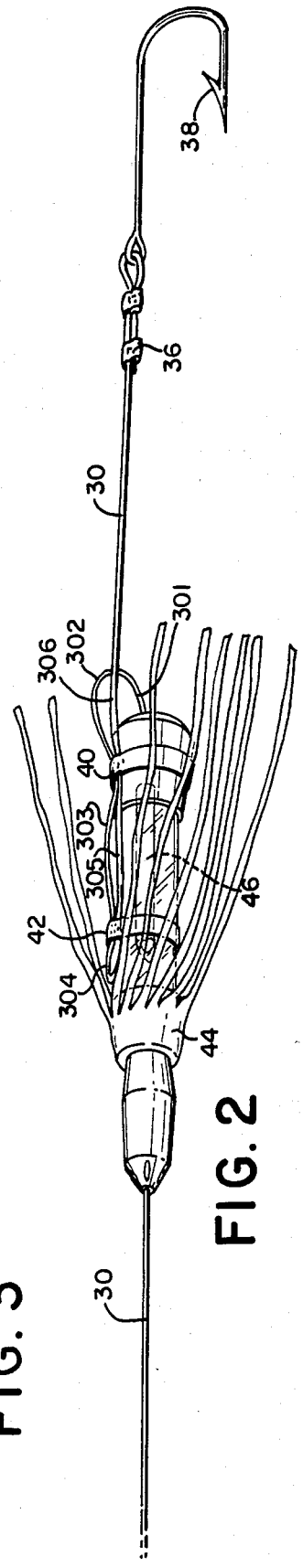

FISHING LURE

BACKGROUND OF THE INVENTION

1. Field of the Invention

This invention relates to the field of fishing lures in general, and in particular, to fishing lures for large game fish.

2. Prior Art

Fishing lures are designed and intended to simulate the appearance of bait fish swimming through the water. In an effort to attract particular kinds of game fish, both fresh and saltwater, such lures are adapted to simulate the appearance of many different kinds of bait fish. The designs include adaptations of shape, color, size and detachable covers, partial covers and skirts. Some lures are designed with movable parts to simulate the swimming motion of such bait fish and still others are designed to produce bubble streams and/or certain noises or vibrations thought to attract game fish.

There is likely more art than science in the development and construction of fishing lures, in the modern sense of these terms. Although such lures come in an almost infinite number of sizes, shapes, colors, movements and noises, certain common characteristics prevail. In every lure known, some part of the lure forms a solid bridge or connection between the hook, or hooks, and the fishing line. The only instances in which this is not true, would be those wherein the lure was attached to the hook or line in some fashion, so that each was pulled through the water by the line. The only exception known is a lure designed to dispense emulsified bait, described in U.S. Pat. No. 3,991,504.

Fish, including bait fish, do not pull themselves through the water. Although there is a certain ripple movement of the entire body of the fish, in almost every instance, fish are pushed through the water by movement of their tails. Despite this, all lures try to simulate the movement of bait fish by pulling such lures through the water. This is true even in those instances where a portion of the lure does not form a bridge between the line and the hook.

It is difficult to characterize particular problems of prior art lures. There is no formula by which the success of a particular lure can be apportioned between its design and the luck and skill of the fisherman. Nevertheless, new lures are regularly being developed, and it seems fair to conclude that the ideal or perfect lure has not yet been developed. The fishing lure described herein is believed to represent a major step toward realization of an ideal fishing lure, in that the movement of bait fish is more accurately simulated because the lure is adapted to be pushed through the water, rather than being pulled through the water. In no way does a lure according to this invention form any part of a bridge or connecting member between the fishing line and the hook or hooks. A fishing lure according to this invention comprises three principal structural elements, namely, a flexible tubular body, a head member attachable to the tubular body at one end and having at least one axial bore therethrough, and an end cap attachable to the tubular body at the other end and having at least one axial bore therethrough. The lure is threadable over a fishing line, which passes through the bore in the head, through the tubular member and through the bore in the end cap. Terminal gear, usually including a length of leader and at least one hook, almost always includes some physical structure which is of some size larger than the diameter of the line itself. Such structure may be an eyelet on one end of the hook, or it may be a clamping member securing a loop of line or leader passing through the eyelet of the hook. In either event, the axial bore of the end cap is of a size sufficiently small to prevent movement of such larger structure, of whatever form, through the axial bore. Accordingly, as the hook is pulled through the water by the line, for example, during trolling, the larger structure of the terminal gear engages the end cap, and through the end cap pushes the entire lure through the body, ahead of the hook. The axial bores in the head member and end cap, as well as additional openings or bores which may be provided, afford an opportunity for water to flow in the head member, through the tubular body and out of the end cap. Such structure produces a stream of bubbles in ordinary, stiff lures which are pulled through the water. In a lure according to this invention, in addition to producing a bubble stream, water flowing into the tubular member produces a drag which somewhat inhibits movement of the lure through the water, and causes the flexible body to flex about the end cap. The flexing movement of the tubular body about the end cap more accurately simulates the swimming motion of bait fish. Such accurate simulation has not heretofore been known. It is believed that water flowing out through the walls of the lure described in U.S. Pat. No. 3,991,504 would defeat such motion. Certainly such an effect is not even suggested therein.

The structure of the lure noted above lends itself to another advantageous feature of this invention, termed "back-drop." In accordance with this aspect of the invention, the lure further comprises first and second elastic members tightly engaging around the lure and spaced from one another, preferably near opposite ends of the flexible tubular body. A long loop of line, or leader, is formed as the line leaves the end cap, and is pulled beneath the elastic members, such that the hook is properly spaced from the end cap. As the lure is pulled steadily through the water during trolling, the hook moves steadily through the water as well. It is not unusual for a fish seeking to strike the lure, and therefore in danger of being hooked, to have the hook pulled from its mouth, or fail to seat properly, due to the steady movement of the hook together with the lure. When utilizing the backdrop feature of this invention, action by the fish on the hook will retard movement of the hook through the water, as the loop of line is pulled from beneath the elastic members. By the time the loop has been fully pulled and the line once again straightened, there will have been sufficient time for the hook to become so firmly embedded that the fish will not be lost by reason of the hook coming loose. In fact, field trials of a fishing lure according to this invention, utilizing the back-drop feature, indicate that hooks are so firmly embedded that they can be removed from the fish only with very great difficulty after the fish has been landed. In most instances, it was a practical necessity to cut the hook or line, and leave at least a portion of the hook embedded.

Fishing lures according to this invention may further comprise additional features common to many such lures, including flexible skirts and self-contained chemical light packages. In connection with chemical light packages, no lures provide a ready compartment for housing such lights as do the fishing lures described herein. As to the flexible skirts, there are many who believe that such skirts are more effective in attracting fisherman than fish, but they are nevertheless easily incorporated.

SUMMARY OF THE INVENTION

It is an object of this invention to provide an improved fishing lure.

It is an other object of this invention to provide an improved fishing lure which more accurately simulates the movement and appearance of a live bait fish.

It is yet another object of this invention to provide an improved fishing lure which is adapted to be pushed through the water, rather than being pulled through the water.

It is still another object of this invention to provide a lure which is adapted to be pushed through the water, and which is adapted to flex in a manner which accurately simulates the movements of a live bait fish swimming through the water.

It is still another object of this invention to provide a fishing lure including additional means to ensure proper embedding of the hook.

It is still another object of this invention to provide a fishing lure which includes a compartment for carrying self-contained lighting means.

These and other objects of this invention are accomplished by a fishing lure for use with a line bearing terminal gear, comprising: a flexible tubular body; a head member attachable to the tubular body at one end and having at least one axial bore therethrough; an end cap attachable to the tubular body at the other end and having at least one axial bore therethrough; and, means for preventing movement of the line through the axial bore in the end cap, the lure being threadable over the line, which passes through the bore in the head, through the tubular member and through the bore in the end cap, whereby the lure flexes on the line as the lure is pushed through the water by the terminal gear engaging the preventing means, as the terminal gear is itself pulled through the water by the line. In a presently preferred embodiment, the preventing means comprises the axial bore in the end cap being large enough in diameter to receive the line, but too small in diameter for structure in the terminal gear to slip therethrough. The head member is preferably a substantially solid, weighted member enabling the lure to travel more deeply through the water.

In a particularly preferred embodiment, the fishing lure further comprises first and second elastic members tightly engaging around the lure and spaced from one another, under which a loop of line or leader may be releasably held. The flexible body forms a chamber for carrying a self-contained chemical lighting means. Finally, the fishing lure may also comprise a skirt member having flexible portions movable over the tubular body as the lure moves through the water.

BRIEF DESCRIPTION OF THE DRAWINGS

There are shown in the drawings forms which are presently preferred, it being understood, however, that this invention is not limited to the precise arrangements and instrumentalities shown.

FIG. 1 is a perspective view of a fishing lure according to this invention;

FIG. 2 is a perspective view of a fishing lure according to this invention, further incorporating the "backdrop" feature, chemical light means and a skirt member;

FIG. 3 is a view taken along the line 3—3 in FIG. 1; and,

FIG. 4 is a section view taken along the line 4—4 in FIG. 1.

DETAILED DESCRIPTION OF THE PREFERRED EMBODIMENTS

A fishing lure according to this invention is shown in FIG. 1, and generally designated by reference numeral 10. The fishing lure 10 comprises a flexible tubular body 12, a head member 14 and an end cap 16.

The tubular body 12 is preferably a section of flexible, transparent or translucent material, for example, vinyl tubing. The head member 14 is preferably made from metal, in order to have the lure operate at a lower depth than it otherwise would. The head member 14 has a cone-shaped leading portion 18, a main body portion 20 which gradually increases in diameter, a tapering portion 22 and a neck portion 24 of substantially uniform diameter. Neck portion 24 terminates in a projecting lip or ridge 26. The outer diameter of neck portion 24 corresponds to the inside diameter of tubular body 12, lip 26 ensuring a snug fit each though the parts may be easily disassembled from one another.

The end cap 16 is preferably made from relatively rigid plastic, having an inside diameter corresponding to the outside diameter of the tubular body 12. Inasmuch as the lure, chiefly comprising the tubular body 12, the head member 14 and end cap 16 is pushed through the water, and does not form even a portion of a bridge between the hook and the line, it is not necessary that the fit between the principal constituent members of the lure be secured to one another in any fashion more than the frictional engagement illustrated. It may be appreciated that the use of a flexible tubular body 12 renders the lure virtually useless as a conventional lure, that is, a lure forming a support bridge or connection for the hook.

The head member 14 is provided with at least one axial bore 28, centrally located, through which the line or leader 30 may easily slide. Additional axial bores 28 may also be provided, in order to enhance or modify a bubble stream effect. End cap 16 comprises at least one axial bore 32 for slidably receiving the line or leader 30. End cap 16 may further comprise additional openings, such as two arcuate slots 34, which operate in conjunction with the at least one axial bore 18 to provide and control the bubble stream effect. Inasmuch as tubular body 12 is hollow, it will be appreciated that lure 10 is freely and slidably mounted upon line or leader 30.

The terminal gear illustrated in FIG. 1 includes a leader or section of line 30 attached to a hook 38. A number of metal clamps 36 are commonly used to secure a loop to which the hook 38 is attached. It will be appreciated that the diameter of axial bore 32 in end cap 16 is smaller than clamp 36. With regard to the orientation of FIG. 1, the lure 10 is freely and slidably mounted upon the line or section of leader 30 to the left of clamp 36, but may not slide to the right, past clamp 36. Accordingly, as the line 30 is pulled through the water, for example, to the left, clamp 36 will engage end cap 16, pushing end cap 16, and through it the entire lure 10, through the water. The weight of head member 14, together with water flowing into the at least one axial bore 18, through tubular body 12 and out arcuate slots 34, creates a certain drag in the lure, relative to movement of the line and hook through the water. Accordingly, flexible tubular body 12 will be induced to flex laterally as it moves through the water, and in particular, will be induced to flex about end cap 16. This flexing movement closely and accurately simulates the movement of a live bait fish swimming through the water, being pushed therethrough by movements of its tail.

It will be appreciated by those skilled in the art that the terminal gear illustrated in FIG. 1 is typical, and conceivably, clamp 36 might not be of sufficient size to push end cap 16. Indeed, if no clamps were utilized, and line 30 were merely tied to the eyelet of hook 38, it would be the eyelet of the hook itself which engaged and pushed against end cap 16. Accordingly, as long as axial bore 32 is only as large as is necessary for a typical fishing line to pass therethrough, there will be at least some structure on the terminal gear, even if it is only the eyelet of the hook itself, which will be effective in engaging and pushing end cap 16, and therefore the entire lure 10.

In a presently preferred embodiment, which is by no means intended to be limiting, the tubular body 12 may be a length of clear vinyl tubing, approximately five inches long and having an inner diameter of three-quarters of an inch. Head member 14 may weigh approximately 3-4 ounces, the neck thereof having an outer diameter of three-quarters of an inch, corresponding to the inner diameter of the tubular body 12. End cap 16 has an inner diameter slightly larger than three-quarters of an inch, corresponding to the outer diameter of the flexible tubular body 12. Suitable terminal gear may comprise a fifteen-foot length of two hundred pound monofilament line attached to a 10/0 hook by metal clamps.

In a particularly preferred alternative embodiment, this invention may be provided with means likely to cause the hook to become more firmly embedded in the mouth of a striking fish than would otherwise be the case, such means being denoted herein as a "back-drop" feature. With reference to FIG. 2, the fishing lure further comprises elastic members 40 and 42 tightly engaging around the lure and spaced from one another. In FIG. 2, elastic member 40 is attached over end cap 16 and elastic member 42 is attached over the tubular body 12, adjacent the head member 14. In connection with the description of this feature, portions of the line or section of leader 30 have been designated by refernce numerals 301 through 306, as the line leaves or exits axial bore 32 of end cap 16. Portion 301 leaves axial bore 32. Loop 302 directs the line back towards head member 14. Portion 303 passes under elastic member 40 and elastic member 42. Loop 304 directs the line back toward end cap 16. Portion 305 is also releasably held beneath elastic member 42 and elastic member 40. Finally, portion 306 leads directly to hook 38. This arrangement may also be described as a large single loop having a leading portion of point 304 and sides 303 and 305 being first pulled under elastic member 40 and then under elastic member 42. Irrespective of the characterization, elastic members 40 and 42 exert sufficient force on the looped portion of line 30 held thereunder for the lure to be pulled through the water by the force exerted by portion 302 as line 30 is pulled to the left, in the orientation of FIG. 2. Loop 302 will in effect push lure 10 through the water, in the same manner as clamp 36 in FIG. 1. During such movement, a fish will strike hook 38, impeding its movement through the water. Rather than having the hook pulled away to the left, together with the rest of the line 30, the back pressure exerted by the fish will pull the line out from beneath the elastic members, providing sufficient time for the hook to be firmly embedded in the fish. When the loop has been pulled out completely, there will be a significant jerk on the line, and on the hook as it begins moving once again under the pull of line 30. The additional time provided for the fish to swallow or chew the hook, followed by the jerk as the line 30 once again becomes taut, will so firmly embed the hook that it will be virtually impossible for it to be worked loose.

A fishing lure according to this invention can be provided with additional features thought to attract fish. The tubular body 12 provides an ideal chamber in which to dispose a chemical light stick 46, for illuminating the lure under low-light conditions and great operating depths. Such chemical light sticks are fully described, for example, in U.S. Pat. Nos. 3,576,987 and 3,597,362. Unlike other kinds of lures, requiring rigid body portions and the line, this invention provides an easily accessible chamber for holding such lighting means. Such lighting means will not at all interfere with the flexing movement of the lure as it is pushed through the water.

As a final adornment, the lure 10 may be provided with a skirt 44 having a plurality of flexible trailing segments, which are thought by many fishermen to further simulate the appearance of a bait fish swimming through the water. Although the use of light sticks and skirts is known in the art, the effect of such features is likely enhanced by the more realistic simulation of the basic bait fish swimming motions.

This invention may be embodied in other specific forms without departing from the spirit or essential attributes thereof. Accordingly, reference should be made to the appended claims, rather than to the foregoing specification, as indicating the true scope of the invention.

What is claimed is:

1. A fishing lure for use with a line bearing terminal gear, comprising:
   a flexible tubular body member;
   a head member attachable to the tubular body at one end and having at least one axial bore therethrough;
   an end cap attachable to the tubular body at the other end thereof and also having at least one axial bore therethrough; and,
   means for preventing movement of the terminal gear through the axial bore in the end cap, the lure being threadable over the line, which passes through the bore in the head member, through the tubular member and through the bore in the end cap, whereby the lure flexes on the line particularly at the end cap as the lure is pushed through the water by structure of the terminal gear engaging the preventing means, as the terminal gear is itself pulled through the water by the line.

2. The fishing lure of claim 1, wherein the preventing means comprises the axial bore in the end cap being large enough in diameter to receive the line, but too small in diameter for structure in the terminal gear to slip therethrough.

3. The fishing lure of claim 1, wherein the head member is a substantially solid, weighted member.

4. The fishing lure of claim 2, wherein the head member is a substantially solid, weighted member.

5. The fishing lure of claim 1, wherein the preventing means comprises a first elastic member tightly engaging around the lure, under which a first loop of the line is releasably held.

6. The fishing lure of claim 2, wherein the preventing means comprises a first elastic member tightly engaging around the lure, under which a first loop of the line is releasably held.

7. The fishing lure of claim 5, further comprising a second elastic member tightly engaging around the lure and spaced from the first elastic member, under which a second loop of the line is releasably held, the second loop having a first leg connected to the first loop.

8. The fishing lure of claim 6, further comprising a second elastic member tightly engaging around the lure and spaced from the first elastic member, under which a second loop of the line is releasably held, the second loop having a first leg connected to the first loop.

9. The fishing lure of claim 1, further comprising self-contained lighting means disposed in the tubular body.

10. The fishing lure of claim 1, further comprising a skirt member.

11. The fishing lure of claim 9, further comprising a skirt member.

* * * * *